US012691626B2

(12) United States Patent
Siegl et al.

(10) Patent No.: US 12,691,626 B2
(45) Date of Patent: Jul. 28, 2026

(54) METHOD FOR PRODUCING A PET STARTING MATERIAL THAT IS SUITABLE FOR USE IN AN EXTRUSION BLOW MOLDING METHOD, AND HOLLOW ARTICLE PRODUCED IN THE EXTRUSION BLOW MOLDING METHOD

(71) Applicant: ALPLA WERKE ALWIN LEHNER GMBH & CO. KG, Hard (AT)

(72) Inventors: Robert Siegl, Dornbirn (AT); Andreas Weber, Thüringen (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 642 days.

(21) Appl. No.: 17/912,459

(22) PCT Filed: Mar. 15, 2021

(86) PCT No.: PCT/EP2021/056527
§ 371 (c)(1),
(2) Date: Sep. 16, 2022

(87) PCT Pub. No.: WO2021/185757
PCT Pub. Date: Sep. 23, 2021

(65) Prior Publication Data
US 2023/0182365 A1     Jun. 15, 2023

(30) Foreign Application Priority Data
Mar. 16, 2020    (CH) .................................... 00304/20

(51) Int. Cl.
*B29C 49/04*        (2006.01)
*B29B 17/02*        (2006.01)
(Continued)

(52) U.S. Cl.
CPC .............. *B29C 49/04* (2013.01); *B29B 17/02* (2013.01); *B29B 17/0412* (2013.01);
(Continued)

(58) Field of Classification Search
None
See application file for complete search history.

(56) References Cited

U.S. PATENT DOCUMENTS 4,161,579 A      7/1979  Edelman
6,436,322 B1 *   8/2002  Fredl ......................... B29B 9/16
                                                    264/141
(Continued)

FOREIGN PATENT DOCUMENTS

DE        19710098 A1      9/1998
EP        0422282 A1       4/1991
(Continued)

OTHER PUBLICATIONS

Yan Haichao et al, "Modification of poly(ethylene terephthalate) by combination of reactive extrusion and followed solid-state polycondensation for melt foaming", Journal of Applied Polymer Science, Band 132, Nr. 44, Nov. 20, 2015 (Nov. 20, 2015).
(Continued)

*Primary Examiner* — Yan Lan
(74) *Attorney, Agent, or Firm* — Morriss O'Bryant Compagni Cannon, PLLC

(57)        ABSTRACT

The invention relates to a method for producing an EBM bottle with 0.90 to 1.5 dL/g from a bottle-grade PET post-consumer recycling flake, i.e., a recycled, post-consumer PET with a viscosity of 0.65 to 0.84 dL/g, using extrusion processes, solid state polycondensation processes, and a blowing process.

20 Claims, 1 Drawing Sheet

Subjective EBM rating relative to extensional viscosity according to Cogswell (EtaCo) at 275°C and 50 s-1.

(51) Int. Cl.

| | |
|---|---|
| *B29B 17/04* | (2006.01) |
| *B29C 48/00* | (2019.01) |
| *B29C 48/06* | (2019.01) |
| *B29C 49/00* | (2006.01) |
| *B29B 17/00* | (2006.01) |

(52) U.S. Cl.

CPC .......... *B29C 48/0015* (2019.02); *B29C 48/06* (2019.02); *B29C 49/0005* (2013.01); *B29B 2017/0015* (2013.01); *B29B 2017/0021* (2013.01); *B29B 2017/0268* (2013.01)

(56) References Cited

U.S. PATENT DOCUMENTS

| | | | | |
|---|---|---|---|---|
| 9,718,949 | B2 * | 8/2017 | Kulshrestha | ........... A61L 31/04 |
| 2016/0039992 | A1 | 2/2016 | Jain | |

FOREIGN PATENT DOCUMENTS

| | | | |
|---|---|---|---|
| EP | 0748346 | B1 | 8/2000 |
| EP | 1054031 | B1 | 8/2005 |
| EP | 2747981 | B1 | 3/2017 |
| EP | 2807082 | B1 | 8/2018 |
| WO | 0121373 | A1 | 3/2001 |
| WO | WO2009129469 | * | 10/2009 |
| WO | WO2014162238 | * | 10/2014 |
| WO | 2018127431 | A1 | 7/2018 |

OTHER PUBLICATIONS

Dennis Berg, "Post-Consumer Poly(ethylene terephthalate)—Properties, Problems during Reprocessing, and Modification by Reactive Extrusion", Dissertation, Dec. 17, 2018 (Dec. 17, 2018), pp. 1-173, XP055706124.

Ulrich Thiele, "Molecular Weight (IV) Change of Polyethylene Terephthalate (PET) During Mechanical Recycling Processes", Convention : Forum Rigid Packaging,Jan. 1, 2016 (Jan. 1, 2016), pp. 1-21.

Awaja F., Pavel D. (2005), Review Recycling of PET, European Polymer Journal 41, pp. 1453-1477.

Cogswell F. N. (1972), Converging flow of polymer melts in extrusion dies, Polym. Eng. Sci. 12, pp. 64-73.

Awaja, Firas, Recycled Awaja et al. (2004), Recycled Poly(ethylene terephthalate) Chain Extension by Reactive Extrusion Process, Polymer Engineering and Science, 44 (8), pp. 1579-1587.

* cited by examiner

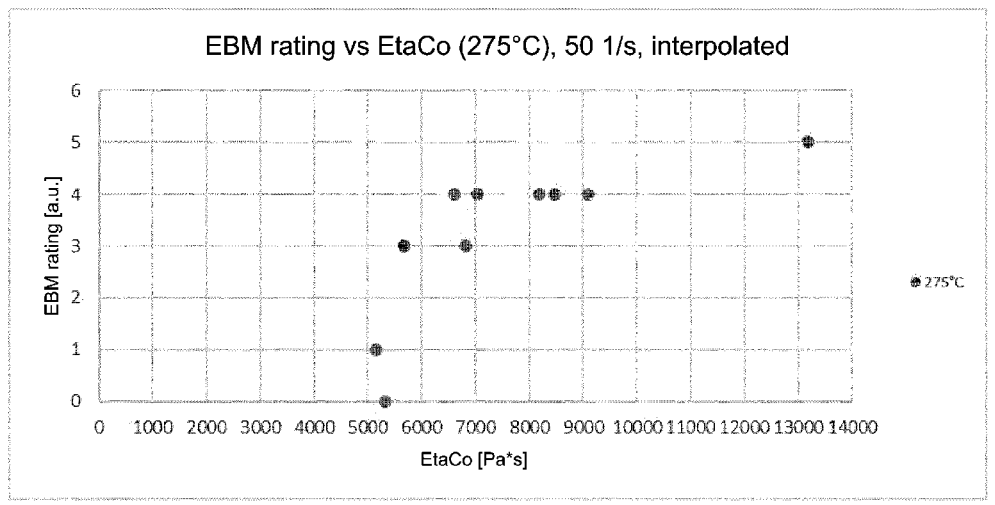
Subjective EBM rating relative to extensional viscosity according to Cogswell (EtaCo) at 275°C and 50 s-1.

METHOD FOR PRODUCING A PET STARTING MATERIAL THAT IS SUITABLE FOR USE IN AN EXTRUSION BLOW MOLDING METHOD, AND HOLLOW ARTICLE PRODUCED IN THE EXTRUSION BLOW MOLDING METHOD

CROSS-REFERENCE TO RELATED APPLICATIONS

This application is a national phase entry under 37 U.S.C § 371 of PCT/EP2021/056527 filed Mar. 15, 2021, which claims priority to Swiss Patent Application No. 00304/20 filed Mar. 16, 2020, the entirety of each of which is incorporated by this reference.

FIELD OF THE INVENTION

The present invention relates to a method for producing a polyester starting material, suitable for use in an extrusion blow molding method, for producing a hollow article made of plastic—in particular, a plastic bottle, and to a hollow article, produced by extrusion blow molding.

PRIOR ART

For the production of PET containers in extrusion blow molding machines, extrusion blow molding can only be used when the PET molding compound has the necessary melt strength, i.e., when the blow-molding tool halves are closed, the plastic tube has a shape and consistency that, during the subsequent inflation and hardening, result in a hollow article that fulfills the predetermined specifications. This applies in particular in the case of Shuttle extrusion blow molding machines, in which the tube is exposed to gravitational forces for a very long time. The melt strength of the PET material, which is used for the stretch blow molding method, in which the containers are formed from a preform produced in an injection molding method, does not fulfill the requirements for extrusion blow molding, since its intrinsic viscosity is too low and, when used in extrusion blow molding, results in said impermissible lengths of the plastic tube. For extrusion blow molding, the PET material must, accordingly, be modified.

According to the prior art, PET molding compounds that are known under short designations such as PET X (extrudable), PET G (glycol-modified), and PET B (branched) are used for extrusion blow molding. Terms such as EPET or E-PET (especially in the USA) or even EBM PET are also common. These are PET materials specifically developed for extrusion blow molding; their produced quantity is low, and they thus have a correspondingly high price. The PET hollow articles produced with these PET molding compounds can in fact be fed into the recycling stream. These hollow articles cannot be blown with the standard recycling material in the market, since this standard recycling material has the usual viscosity of the most frequent bottle product, but EBM requires a higher viscosity.

Standard PET types are understood to mean linear (not branched) PET types with a low copolymer fraction of less than 5 wt % and an intrinsic viscosity (IV) between 0.72 and 0.86 dL/g (according to ASTM D 4603).

The PET, which is nowadays used mainly for the production of bottles in a stretch blow molding process, is a PET with an intrinsic viscosity (IV) between 0.72 and 0.86 dL/g measured according to ASTM D4603. During the processing of PET with the one-stage or two-stage stretch blow molding process that is most frequently used in practice (Injection Stretch Blow Molding=ISBM), the material viscosity typically decreases by between 0.01 to 0.09 dL/g.

In the PET recycling process used nowadays, the decrease in viscosity that took place in the production process is compensated for again using solid state polycondensation (SSP, also referred to below as "SSP process"), and the original viscosity of 0.72 to 0.86 dL/g is thus achieved.

In contrast to the stretch blow molding process used most frequently for the production of PET bottles, extrusion blow molding (Extrusion Blow Molding=EBM), however, requires viscosities of between 0.9 and 1.4 dL/g. This means that the material obtained in the standard PET recycling process and also common reclaimed materials thereof cannot be used for the EBM process.

According to more recent legislation, the plastics industry is, however, obliged to use up to 35% recycling material in newly-produced bottles. This legal requirement relates to both the ISBM method and the EBM method. In principle, it would be desirable if the PET bottles produced in the EBM method, the materials of which have an increased viscosity, could be collected separately so that these materials could be used again in an EBM method. Unfortunately, this is, however, not yet possible for economic reasons, since the economy of scale does not allow this separate collection stream and recycling stream for very small quantities.

In the standard PET recycling stream, however, the high-viscosity EBM bottles that usually only occur in small quantities are not disruptive, since the chains mutually equalize due to the cross-esterification that takes place in the melt.

However, the viscosity of the standard PET recycling stream is much too low to be able to add 20 wt % or more recycling PET material to an EBM method.

EP2747981B1 and EP2807082B1 describe that PET for ISBM (typical new goods have an intrinsic viscosity IV between 0.72 and 0.86 dL/g) can be brought via solid state polycondensation to an IV of 0.96 to 1.4 dL/g for use in an EBM method.

WO2018127431 (A1) discloses a method for raising material from the standard PET recycling stream to the desired viscosity by means of a longer dwell time in the SSP reactor. A longer dwell time in the SSP reactor, however, also has decisive disadvantages; for example, the higher dwell time throttles the output capacity of the recycling factory, depending upon the target viscosity, by 2 to 8 times. Moreover, the longer dwell time in the SSP reactor results in stronger yellowing of the material.

An alternative way to increase the molecular mass of PET is the use of so-called chain extenders. Known in the prior art is the chain extension of rPET by using the chain extender pyromellitic dianhydride (PMDA) by means of reactive extrusion. Reactive extrusion means that the rPET reacts in the melt directly with the PMDA during the dwell time in the extruder and is immediately supplied for use in a forming or primary forming process.

EP0748346B1 discloses a method for increasing the molecular weight of polyesters, in which a mixture of a polyester and a tetracarboxylic dianhydride and a sterically-hindered hydroxyphenyl alkyl phosphonic acid ester, e.g., Irganox® 1425 (BASF), is heated, in the case of crystalline polyesters, to above the melting point or, in the case of amorphous polyesters, to above the glass transition temperature.

In comparison to EP0748346B1, EP1054031B1 describes a somewhat different formulation for the chain extension of polyesters (also rPET) where, together with a polyfunctional anhydride (polyanhydride) (=component a), at least one polyfunctional compound, whose functional groups can react with the anhydride groups of the polyanhydride (=component b), at least one phosphonate (=component c) is also used. A polyol, a polyfunctional epoxy compound, a polyamine, polyaziridine, polyisocyanate, polyoxazoline, or a polyfunctional thioalcohol is suitable as component b. In the case of the reactive extrusion of the aforementioned 3-component mixture together with a polycondensation polymer, the molecular weight can be greatly increased in short reaction times. It has been found that by adding polyfunctional components, no crosslinked polycondensates are produced, but, rather, the polyfunctional compounds are substantially incorporated into the chain and result in chain extensions and/or branches. For reactive extrusion, temperatures are proposed which preferably are in the range between the melting temperature and a temperature about 50° C. above the melting temperature. In the case of amorphous polyesters, the reaction takes place about in the range between 50° C. and 150° C. above the respective glass transition temperature.

Extrusion blow-molded products are also to be producible from the modified polycondensate. A disadvantage of this approach is that the higher the quantity of chain extenders used, with or without chain branchers, the risk of crosslinking and gel formation occurring tends to exist (see Awaja et al. (2004)). These gels are visible as fish eyes (=high-viscosity grains) in extrusion blow-molded hollow articles, and constitute a visual defect. In addition, crosslinked polyesters may tend to be impeded in their crystallization, which can lead to significant problems in a renewed run in the PET recycling stream when the material does not crystallize. Typically, the tool of choice for reactive extrusion is the twin-screw extruder (Awaja and Pavel (2005)).

Typical EBM PET types, which are nowadays used for the production of bottles in an EBM method, are, for example, Indorama Polyclear 5507, PETKO PET 160-X. Typical EBM PET types generally have the narrow molecular weight distribution typical for polycondensates without considerable long chain branching, and thus cause low melt elasticity. This is manifested in low elastic restoring forces when exiting the nozzle gap, which results in a low diameter and thickness swelling of the tube. This has the disadvantage that, in comparison to the materials that are otherwise customary in extrusion blow molding, such as HDPE or PP, the freely-suspended tube in extrusion blow molding greatly changes in length, primarily due to gravity, much faster, and a significantly narrower process window is therefore given.

Aim

It is an aim of the present invention to provide a material for extrusion blow molding—in particular, of PET bottles—which material may primarily originate from rPET, which is obtained from the collection of post-consumer PET articles—in particular, PET bottles. In particular, it is a goal that the material be compatible with the PET recycling stream and partially crystalline. A further goal is that the material have a high melt stiffness and therefore be particularly suitable for extrusion blow molding. Another goal is that as few additives as possible be added for the production of the material, in order to not significantly impair the purity of the PET recycling stream. A further goal is that the production of the material be significantly faster than pure condensation of rPET in solid state polycondensation. In addition, the material should be low in gel and, when used, should provide bottles with few fish eyes.

Definitions

In the context of the present invention, the term, "viscosity," is understood to mean the intrinsic viscosity (IV) measured according to the ASTM 4603-03 standard.

In the context of the present invention, "correctly sorted PET" is understood to mean that PET has been sorted within the scope of today's technological possibilities so that the weight-based proportion of non-sorted plastic is less than 2%, preferably less than 1%, and particularly preferably less than 0.5%.

rPET is used in the present document as a short designation for recycled, post-consumer PET.

The term, "bottle-grade PET post-consumer recycling flake," refers to rPET which originates from the collection of post-consumer PET articles—in particular, PET bottles—and is processed to form flakes.

In the context of the present invention, EBM PET is understood to mean PET (including PET copolymers) which is suitable for use in an EBM process, i.e., has an IV between 0.87 dL/g and 1.4 dL/g.

SUMMARY

According to the invention, the aim is achieved in a method for producing a polyester starting material—in particular, PET starting material—suitable for use in an extrusion blow molding method, for producing a hollow article made of plastic—in particular, a plastic bottle—in which a) post-consumer PET articles—in particular, PET bottles—are correctly sorted by type, washed, and comminuted, b) contaminants, such as metal or paper, are removed before, simultaneously to, or after method step a), c) the comminuted PET material is subsequently dried, d) the comminuted PET material is then melted, a chain extender or chain brancher is admixed, and the melt of comminuted PET material and chain extender or chain brancher is extruded reactively, wherein the admixing of the chain extender or the chain brancher can take place before or during melting, and e) granules are produced from the melt, wherein the condensed PET material is hereafter also referred to as "EBM PET" for short.

The intrinsic viscosity of the extruded granules is further increased by a subsequent heat treatment in solid state polycondensation (SSP). Surprisingly, the viscosity can be significantly increased once again by solid state polycondensation. This effect was unexpected, since it had to be assumed that the chain extender or chain brancher admixed in method step d) had already reacted and no further chain extension taken place. In addition, the granules are not present in the SSP reactor as a melt, but in a partially crystalline state. In comparison to the melt, the chain mobility is reduced in the amorphous zones, and even greatly reduced in the crystallites, which should specifically result in a greatly reduced reactivity in the crystalline regions. Overall, the chain mobility is already lower, since the operating temperature in the SSP is below the melting temperature and, in the reactive extrusion, is significantly above the melting temperature. It follows from the Arrhenius approach for reaction rates that an increase in the temperature by 10 K brings about approximately a doubling of the reaction rate. Accordingly, the person skilled in the art could not expect that, with the restricted mobility of the molecules, a further, substantial condensation can take place.

In one embodiment, the solid state polycondensation takes place at temperatures ≤225° C. This has the advantage that the granules are preserved and yellow less than at even higher temperatures, which are typically at 225° C. or higher in an SSP process for PET (cf. EP 1O54 031, [108]).

The viscosity increase in method step f) above may be higher than that in method step d). This viscosity increase in method step f) is surprising to the person skilled in the art, since the PET in method step f) is not present as a melt, but as granules.

In a further embodiment of the invention, the dwell time of the granules In the SSP reactor is less than 20 h, less than 15 h in another embodiment, or less than 12 h in yet another embodiment. The relatively short dwell time can not only shorten the production method, but also prevent yellowing of the granules which occurs in excessively long dwell times.

In a further embodiment of the invention, the post-consumer PET material used in method step a) has above may have a viscosity between 0.65 and 0.84 dL/g. The starting material therefore has a low viscosity and can nevertheless be converted by the inventive method into a material that is usable for an EBM process and has a corresponding viscosity.

The method advantageously makes it possible for the viscosity of the material used to be increased by 0.05 to 0.2 dL/g by reactive extrusion.

According to a further embodiment of the invention, the viscosity is increased by a further 0.1 to 0.6 dL/g, by 0.15 to 0.55 dL/g in another embodiment, or 0.3 to 0.55 dL/g in yet another embodiment, using solid state polycondensation. The viscosity of the PET starting material can therefore be increased in an SSP reactor and in reactive extrusion.

It is advantageous if the temperature during extrusion and the quantity of chain extender are selected such that the extruded material has an intrinsic viscosity (IV) greater than 0.75 dL/g, between 0.75 and 0.9 dL/g in another embodiment, or between 0.8 and 0.9 dL/g in another embodiment. This viscosity is optimally suitable for the production of a hollow article produced in EBM from plastic.

Advantageously, the chain extender used is a polyfunctional anhydride, i.e., a molecule with two or more anhydride groups.

According to a further embodiment of the invention, tetracarboxylic dianhydrides are used as chain extenders.

According to a further embodiment of the invention, pyromellitic dianhydride is used as chain extender.

According to a further embodiment of the invention, one of the chain extenders mentioned below is used: bisoxazolines, bisepoxides, diisocyanates, polyepoxides, compounds carrying several glycidyl groups, maleic anhydride, phthalic anhydride, triphenyl phosphates, lactamyl phosphites, ciclo phosphazene, polyacyl lactam, and also bis-2-oxazolines, bis-5,6-dihydro-4h-1,3-oxazines, diisocyanates, trimethyl 1,2,4-benzene tricarboxylate (trimethyl trimellitate, TMT), carbonyl bis (1-caprolactam). These are typical chain extenders and have proven successful for the reliable chain extension in rPET.

Polyols and polycarboxylic acids are, advantageously, used as chain branchers.

Compounds having more than two hydroxyl groups are, advantageously, used as chain branchers.

Glycerol, pentaerythritol, or a combination of the two compounds are, advantageously, used as polyols.

According to a further embodiment of the invention, between 0.05 wt % and 1.0 wt % of chain extender is admixed to the rPET.

According to a further embodiment of the invention, the extruded melt is filtered before the granulation. In another embodiment, a further chain formation takes place after the filter, in order to avoid an excessively high melt pressure.

According to a further embodiment of the invention, the extruded melt is pressed through a perforated filter with a hole size between 30 μm and 300 μm, or between approximately 50 μm and 100 μm in another embodiment. As a result, the melt has sufficient purity, and turbidities and impurities in the end product of a hollow article can be prevented.

According to a further embodiment of the invention, an acid scavenger is admixed to the PET material before the extrusion. Acid scavengers hinder acid-catalyzed chain cleavage (hydrolysis) of PET in the melt.

According to a further embodiment of the invention, the acid scavenger used is calcium stearate, zinc stearate, zinc oxide, or hydrotalcite, or a combination of the aforementioned acid scavengers.

According to a further embodiment of the invention, the material is degassed during the extrusion. As a result of the degassing, the viscosity of the material can be increased by a further 0.01 to 0.1 dL/g.

According to a further embodiment of the invention, the rPET material obtained in method step f) above is supplied to the EBM system, and a chain extender is added in the EBM system. This increases the viscosity by reactive extrusion. The fine adjustment of the required viscosity can therefore take place in the blow molding machine. For example, the extruded tube for producing smaller bottles requires a lower viscosity, since lower tensile forces due to gravity arise.

According to a further embodiment of the invention, the melt is split into thin layers or strands in the extruder. As a result, the surface of the material is massively enlarged.

According to a further embodiment of the invention, the extrusion takes place in vacuo or in a protective gas atmosphere—in particular, under nitrogen. The viscosity can thereby be increased by 0.1 to 0.5 dL/g. In particular, when the surface of the melt is enlarged by splitting into layers and strands, this form of extrusion is particularly efficient.

According to a further embodiment of the invention, one tube or several tubes are extruded, blown into one or more hollow articles, and then cut off. According to a further embodiment of the invention, one tube or several tubes are extruded, said tube(s) are cut off and then blown into one or more hollow articles.

Advantageously, the strength of the tube is increased by active cooling by 5 to 50° C.

The cooling of the tube, advantageously, takes place by expansion of the tube, contact with another medium, by blowing nozzles, aerosols, or other forms of heat dissipation—in particular, by means of heat pipes.

According to a further embodiment of the invention, "untreated" PET (new goods or rPET) with an IV (intrinsic viscosity) of 0.6 to 0.95 dL/g in a mass fraction of 0 to 50% is admixed to the PET in order to adjust the melt strength in an article-specific manner. The high melt strength of the treated PET allows the admixture of untreated PET. As a result, the price of the starting material for producing a hollow article can be reduced.

A further aspect of the invention relates to a hollow article—in particular, a bottle—made of at least partially recycled PET. The hollow article is characterized in that the PET starting material for producing the hollow article contains between 30 wt % and 100 wt % rPET with an intrinsic viscosity between 0.90 and 1.5 dL/g and an extensional viscosity of more than 6,500 Pa*s (275° C., 50 s, and between 70 wt % and 0 wt % vPET.

Advantageously, the hollow article can be obtained from a method as described above.

According to a further embodiment of the invention, the recycled PET is produced from recycled, post-consumer PET (bottle-grade PET post-consumer recycling flake) with a viscosity of between 0.65 and 0.84 dL/g by condensing.

Advantageously, the PET starting material of the finished hollow article has a shear viscosity at 275° C. and 50 s$^{-1}$ of less than 3,000 Pa*s, and in particular between 1,000 and 2,500 Pa*s. According to a further embodiment of the invention, the PET starting material for producing the hollow article has an extensional viscosity (at 275° C., 50 s-1) of at least 5,500 Pa*s at 275° C. in the production of hollow articles with a volume between 100 mL and approximately 500 mL, and more than 7,000 Pa*s for hollow articles with a volume of more than 500 mL or more than 600 mL, and in particular between 7,000 Pa*s and 14,000 Pa*s.

Exemplary tetracarboxylic dianhydrides which can be used as chain extenders are pyromellitic dianhydride, benzophenone tetracarboxylic dianhydride, 1,1,2,2-ethane tetracarboxylic dianhydride, 1,2,3,4-cyclopentane tetracarboxylic dianhydride, diphenyl sulfone tetracarboxylic dianhydride, 5-(2,5-dioxo tetrahydro-3-furanyl)-3-methyl-3-cyclohexane-1,2-dicarboxylic dianhydride, bis-(S,4-dicarboxylic acid phenyl) ether dianhydride, bis-(3,4-dicarboxylic acid phenyl) thioether dianhydride, 2,2-bis(3,4-dicarboxylic acid phenyl) hexafluoropropane dianhydride, 2,3,6,7-naphthalene tetracarboxylic dianhydride, bis(3,4-dicarboxylic acid phenyl) sulfone dianhydride, 1,2,5,6-naphthaline tetracarboxylic dianhydride, 2,2',3,3'-biphenyl tetracarboxylic dianhydride, hydrochinone bis-ether dianhydride, 3,4,9,10-perylene tetracarboxylic dianhydride, 1,2,3,4-cyclobutane tetracarboxylic dianhydride, 3,4-dicarboxy-1,2,3,4-tetrahydro-1-naphthalene succinic dianhydride, bicyclo(2,2)oct-7-en-2,3,5,6-tetracarboxylic dianhydride, tetrahydrofuran-2,3,4,5-tetracarbonxylic dianhydride, 2,2-bis(3,4-dicarboxy phenyl) propane dianhydride, 3,3',4,4'-biphenyl tetracarboxylic dianhydride, 4,4'-oxydiphthalic dianhydride (ODPA), ethylenediamine tetracarboxylic dianhydride (DDTAh), or combinations of these dianhydrides.

BRIEF DESCRIPTION OF THE DRAWING

FIG. 1 shows a subjective EBM rating relative to extensional viscosity according to Cogswell (EtaCo) at 275° C. and 50 s$^{-1}$

DETAILED DESCRIPTION

Examples

Methods:

The melt-rheological characterization was carried out according to ISO 11443:2014. Samples are dried in vacuo at 120° C. for 12 h. A Gaffed Rheograph 75 with 2×15 mm test channel was used for the test. The capillaries 10/1 and 0/1 mm were used. The test temperature was 275° C. A Bagley correction and Rabinowitsch-Weissenberg correction was carried out. Both the shear viscosity and the extensional viscosity were determined. Using the method according to Cogswell (first description by Cogswell in 1972), the extensional viscosity was determined from the inlet pressure losses by means of WinRheo II software (Gattfert Werkstoffprüfmaschinen GmbH, Buchen, Germany).

Example 1

A commercially available new PET article for injection molding (IV 0.8 dL/g) was left in an SSP reactor at 215° C. for a period of 17 h. During the test in an EBM system, the material had a relatively poor melt stiffness. A cosmetic bottle of approx. 20 cm height and approx. 400 mL volume could only be formed with difficulty.

Examples 2-4

Commercially available types of new EBM PET goods were procured. A cosmetic bottle of approx. 20 cm height and approx. 400 mL volume could only be formed with difficulty from the material of Example 2. In contrast, the material of Example 3 was well-suited for this purpose. From the material of Example 4, bottles with handles and a volume of 1 L or greater could be formed.

Example 5

Commercially available rPET granules consisting of post-consumer waste were procured and left in the SSP reactor at 210° C. for 15 h. The material is suitable for the production of the above-described cosmetic bottle.

Example 6

Commercially available rPET granules consisting of post-consumer waste were procured and left in the SSP reactor at 215° C. for 22 h. The material is suitable for the production of the above-described cosmetic bottle.

Examples 7 and 8

Ground stock of post-consumer PET waste (IV 0.792 dL/g), e.g., in the form of flakes or snippets, was admixed in an extruder with 0.105% PMDA (Example 7: PMDA in solid carrier; Example 8: PMDA in liquid carrier) and supplied to granulation. The IV of the resulting semicrystalline granules was 0.847 dL/g (Example 7) or 0.867 dL/g (Example 8). The granules with a crystallinity of between 40 and 60% were left in the SSP reactor at 200° C. for 10 h. To the surprise of the inventors, the treated granules had a very high extensional viscosity, which also manifested in these materials exhibiting a very high or high tube stability in the EBM system. At the same time, a low melt pressure occurred in these materials due to the low shear viscosity in relation to the extensional viscosity.

TABLE 1

Material examples (shear and extensional viscosity measuring methods; see above)

| No: | Starting material | Chain extender | SSP | IV (ASTM D4603) [dL/g] | Shear viscosity 275° C. at 50 S$^{-1}$ [Pa*s] $^{a)}$ | Extensional viscosity 275° C. 50 S$^{-1}$ [Pa*s] $^{b)}$ | Tube stability in EBM system |
|---|---|---|---|---|---|---|---|
| 1 | New PET goods, condensed | — | 215° C., 17 h | 1.193 | 1,669 | 5,331 | Poor |
| 2 | New EBM PET goods | — | | 1.161 | 1,891 | 5,151 | Poor |
| 3 | New EBM PET goods | — | | 1.292 | 2,186 | 5,677 | Moderate |
| 4 | New EBM PET goods | — | | 1.400 | 3,274 | 9,088 | Good |
| 5 | rPET, condensed | — | 210° C., 15 h | 1.198 | 2,294 | 6,826 | Good |
| 6 | rPET, condensed | — | 215° C., 22 h | 1.239 | 1,899 | 6,610 | Good |
| 7 | rPET admixed with PMDA and condensed | 0.105% PMDA, solid carrier | 200° C., 10 h | 1.194 | 1,657 | 13,192 | Very good |
| 8 | rPET admixed with PMDA and condensed | 0.105% PMDA, liquid carrier | 200° C., 10 h | 1.074 | 1,452 | 7,641 | Good |

$^{a)}$ The values for 50 s$^{-1}$ were derived from the measurement data via Carreau approximation, since the shear rates typically cannot be determined as precisely. The measurement range was typically in the range of 10 to 3,000 s$^{-1}$. The determination was carried out as described under "Methods"
$^{b)}$ Method according to Cogswell, determination by means of Gttfert WinRheo II software (Gttfert Werkstoff-Prfmaschinen GmbH, Buchen, Germany). Caution: Measuring points were interpolated from measurement data. The determination was carried out as described under "Methods."

Examples 7 and 8 show that, by using PMDA in "mild" reaction conditions (lower process temperature, significantly shorter dwell time), work can be done in the SSP, and even higher extensional viscosities can be achieved than without using PMDA and with the significantly longer dwell times and process temperatures in Examples 5 and 6. The comparison of Examples 1 and 5 or 6 shows that rPET can basically have faster reaction kinetics than vPET (new goods). However, the behavior of rPET can definitely also fluctuate, depending upon the composition of the incoming goods flow.

The examples also show that the intrinsic viscosity is in general not a suitable measure of the suitability of PET types for EBM. For example, Examples 1 and 7 show an almost identical IV of 1.193 dL/g or 1.194 dL/g. The same is true for the shear viscosities of 1,669 Pa*s and 1,657 Pa*s at 275° C. and 50 s$^{-1}$. At the same time, however, the two materials show massive differences in the extensional viscosity of 5,331 Pa*s or 13,192 Pa*s at 275° C. and 50 s$^{-1}$. One weakness of the IV is in fact also that relatively small sample quantities in relation to the melt-rheological properties are used in the determination. In the case of materials that are quite prone to inhomogeneities (which recyclates can definitely be), this can lead to strongly scattering IV measured values or, in general, to a low accuracy of the determination.

New and absolutely unexpected is the high swelling (diameter swelling) in comparison to all previously processed EBM PET types (new and rPET-based PET goods). This is an indication of a high melt elasticity. This is not typical for PET, since PET typically has a narrow molar mass distribution for production-related reasons or as a result of cross-esterification, and the polymer chains can thus relax very quickly, and the PET melt typically has a low melt elasticity as a result. Typically to be expected for PET is the following:
　low melt stiffness
　low or no swelling tendency at the nozzle outlet
　no or hardly any extensional strain hardening in the melt
　Contrary to expectations, the rPET treated according to the invention showed an atypical behavior characterized by a high melt elasticity or extensional viscosity, as described with reference to the above examples, and a high swelling tendency. The high extensional viscosity in relation to the low shear viscosity is an indication of a rather elastic nature of the rPET treated according to the invention. As a result of the resulting high elastic restoring forces, these materials show a much lower tendency to adhere to metal surfaces in contrast to the materials of Examples 1 through 5 (materials with rather plastic behavior). Without these elastic restoring forces, the melt behavior with respect to metallic surfaces would be controlled by the wetting behavior (surface tension).

Description of FIG. 1:
　FIG. 1 shows the subjective EBM rating relative to extensional viscosity according to Cogswell (EtaCo) at 275° C. and 50 s$^{-1}$. The EBM rating results as follows: Materials that were difficult, even in the production of small bottles, as in Examples 1 and 2 above, were rated 0 (unsuitable) or 1 (difficulties with small bottle format). Materials that could be processed without problems for the aforementioned cosmetic bottle were rated 3. Materials that would be suitable for bottles with 1 L capacity or slightly larger (up to 5 L) were rated 4. In order to be able to take account of the observed, subjective melt strength that was even higher than class 4 in the EBM system, class 5 has also been introduced. It is apparent from FIG. 1 that the extensional viscosity defines a limit curve similar to a part of a parabola. It is not known whether this limit curve approaches an asymptote, since data in this respect are not available. This is currently also not relevant to the intended use according to the present invention of the materials. However, the limit curve clearly shows that an extensional viscosity of the PET of approx. at least 5,500 Pa*s at 275° C. and 50 $s^1$ must be present so that it is suitable for extrusion blow molding of small hollow articles, i.e., of those with a volume between 100 mL and 500 mL, whereas, for larger hollow articles, i.e., for hollow articles with a volume greater than 500 mL, at least 6,500 Pa*s are required.

Description of the Method:

In a first process step, post-consumer PET bottles are correctly sorted by type, washed, and cut, and contamination, such as metal, paper, and other contaminants, are removed.

In a second process step, the cut PET flakes are dried. Conditions in which the PET molecular weight increases can already be created during drying. (e.g., Vacurema method of the company EREMA Engineering Recycling Maschinen and Anlagen Ges.m.b.H., Ansfelden, Austria).

In a third process step, a chain extender and/or a chain brancher is admixed to the PET, and reactive extrusion of the flakes is carried out, which may be under vacuum. Under these conditions, the PET is rapidly condensed during the extrusion, i.e., the average molecular weight of the rPET increases. Instead of carrying out the extrusion under vacuum, it can also take place in a protective gas atmosphere.

Optionally, with the addition of the chain extender or the chain brancher, 0.01 to 1.0 wt %, and preferably 0.05 to 0.8 wt %, of an acid scavenger, such as calcium stearate, zinc stearate, zinc oxide, or hydrotalcite, or a combination of these acid scavengers, can additionally be admixed to the rPET, and the extrusion of the flakes can then be carried out. In this case, the acid scavenger can prevent or at least reduce the acid-catalyzed chain cleavage (hydrolysis) of PET in the melt.

Optionally, stabilizing phosphorus compounds in the form of an acid (e.g., H3PO4) or an acid ester on the order of 0 to 50 ppm can be added to the rPET.

In a subsequent process step, the melt is filtered (optionally) and granulated.

In a subsequent process step, the granules are placed into an SSP reactor, and their viscosity is increased to above 0.9 dL/g.

In a subsequent process step, the material can be dried in the extrusion blow molding machine, wherein the viscosity is increased once again at a corresponding temperature. Optionally, the material can be mixed again with a chain extender and can be raised to a viscosity useful for the EBM process. In this case, the chain extender can be added before or simultaneously to the extrusion.

The material may be transferred directly from the SSP reactor into the EBM system. If, on the other hand, the material is filled, e.g., into Bigbags or storage containers, after the SSP process because it cannot be further processed directly, the residual moisture may be adjusted to below 50 ppm, or below 30 ppm (typically, by drying immediately before processing in the EBM system).

Small bottles require a lower viscosity than larger ones, since the tube is smaller, and lower tensile forces due to gravity arise. The fine adjustment of the viscosity can therefore take place in the blow molding machine in a product-related manner.

In the extrusion blow molding process, so-called slugs arise, which are separated from the final bottle and are preferably again supplied to the process by comminuting them to form flakes, the ground PET stock, and subjecting them to polycondensation in the SSP reactor or dryer. As a result, the viscosity of the ground PET stock can again be increased. This is important, since the intrinsic viscosity is typically reduced from 0.03 to 0.3 dL/g during extrusion. Optionally, a chain extender can also be admixed to the ground PET stock in order to enhance condensation.

In an optional process step, "untreated" PET (new goods (vPET) or rPET) with an IV of 0.6 to 0.95 dL/g in a mass fraction of 0 to 50% can be admixed to the rPET treated as described above, in order to adjust the melt strength in an article-specific manner. Because a high melt strength of the treated rPET can be achieved with the method according to the invention, the admixture of non-treated rPET or of vPET is allowed. As a result, the costs of the method can be reduced.

In an optional process step, a degassing zone is present in the extruder (method step d) and increases the PET by 0.01 to 0.10 dL/g during extrusion.

In an optional process step, melt splitting into thin layers or strands takes place in the extruder, as a result of which the surface of the material is massively enlarged and made more accessible for melt polymerization (condensation). As a result, the intrinsic viscosity can be increased by 0.10 to 0.50 in the melt. This process step ideally takes place under vacuum or a protective gas atmosphere—for example, under nitrogen.

In a subsequent process step, a tube is extruded and blown into a hollow article and cut. The remaining slugs above and under the bottle are separated off.

In an optional process step, the strength of the extruded tube can be increased by cooling the tube by 5 to 50° C. The cooling is carried out either by expansion of the tube, by contact with another medium, by blowing nozzles, by aerosols, or other forms of heat dissipation—in particular, by means of heat pipes. Through the evaporation of a medium, heat pipes lead to very uniform cooling, with temperature differences of less than 1° C.

In summary, the subject matter of the invention is a method for producing an EBM bottle with 0.90 to 1.5 dL/g from a bottle-grade PET post-consumer recycling flake, i.e., a recycled, post-consumer PET with a viscosity of 0.65 to 0.84 dL/g, using extrusion processes, solid state polycondensation processes, and a blowing process.

SOURCES

Awaja F., Pavel D. (2005), Review Recycling of PET, European Polymer Journal 41, pp. 1,453-1,477

Awaja et al. (2004), Recycled Poly(ethylene terephthalate) Chain Extension by Reactive Extrusion Process, Polymer Engineering and Science, 44 (8), pp. 1,579-1,587

Cogswell F. N. (1972), Converging flow of polymer melts in extrusion dies, Polym. Eng. Sci. 12, pp. 64-73

The invention claimed is:

1. A method for producing a PET starting material suitable for use in an extrusion blow molding method, for producing a hollow article made of plastic, comprising:
   a) sorting by type, washing and comminuting post-consumer PET articles, wherein the post-consumer PET material has an intrinsic viscosity between 0.65 and 0.84 dL/g,
   b) removing contaminants before, simultaneously to, or after step a),
   c) drying the comminuted PET material,
   d) melting the comminuted PET material, admixing a pyromellitic dianhydride as a chain extender or chain brancher, and extruding reactively the melt of comminuted PET material and chain extender or chain brancher, wherein the admixing of the chain extender or the chain brancher can take place before or during melting, and wherein a temperature during extrusion and a quantity of chain extender or chain brancher are selected such that the reactive extrusion increases the intrinsic viscosity by 0.05 to 0.2 dL/g and the extruded material has an IV greater than 0.75 dL/g,
   e) producing granules from the extruded PET material, and
   f) increasing an intrinsic viscosity of the granules further by a subsequent heat treatment in solid state polycondensation, wherein the solid state polycondensation is carried out at temperatures of ≤225° C. increasing the intrinsic viscosity by a further 0.1 to 0.6 dL/g to above 0.9 dL/g.

2. The method according to claim 1, wherein the intrinsic viscosity increase of the granules in step f) is higher than that in method step d).

3. The method according to claim 1 or 2, characterized in that the solid state polycondensation is carried out at a temperatures of ≤200° C.

4. The method according to claim 1, wherein a dwell time of the granules in an SSP reactor is less than 12 h.

5. The method according to one of claim 1, wherein the intrinsic viscosity is increased by a further 0.15 to 0.55 dL/g using solid state polycondensation.

6. The method according to claim 1, wherein a temperature during extrusion and a quantity of chain extender or chain brancher are selected such that the extruded PET material has an intrinsic viscosity between 0.8 and 0.9 dL/g.

7. The method according to claim 1, wherein between 0.05 wt % and 1.0 wt % of chain extender or chain brancher are admixed to the PET material.

8. The method according to claim 1, wherein the extruded PET material is filtered before granulation.

9. The method according to claim 1, wherein the extruded PET material is pressed through a perforated filter with a hole size between 30 μm and 300 μm.

10. The method according to claim 1, further comprising admixing an acid scavenger to the PET material before the extrusion.

11. The method according to claim 10, wherein the acid scavenger is calcium stearate, zinc stearate, zinc oxide, or hydrotalcite, or a combination thereof.

12. The method according to claim 1, wherein the PET material is degassed during the extrusion.

13. The method according to claim 1, wherein the PET material obtained in method step f) is supplied to an EBM system, and another chain extender or chain brancher is added once again in the EBM system.

14. The method according to claim 1, wherein the PET melt is split into thin layers or strands in the extrusion.

15. The method according to claim 1, wherein the extrusion takes place in vacuo or in a protective gas atmosphere.

16. The method according to claim 1, wherein the PET material is extruded into a tube, blown into a hollow article, and then cut off.

17. The method according to claim 16, wherein a strength of the tube is increased by active cooling by 5 to 50° C.

18. The method according to claim 17, wherein a hose is cooled by expansion of the tube, contact with another medium, by blowing nozzles, aerosols, heat pipes or heat dissipation.

19. The method according to claim 1, further comprising admixing untreated PET comprising new PET or rPET with an intrinsic viscosity of 0.6 to 0.95 dL/g in a mass fraction of 0 to 50% to the PET in order to adjust a melt strength in an article-specific manner.

20. A method for producing a PET starting material suitable for use in an extrusion blow molding method, for producing a hollow article made of plastic, comprising:
   a) sorting by type, washing and comminuting post-consumer PET articles, wherein the post-consumer PET material has an intrinsic viscosity between 0.65 and 0.84 dL/g,
   b) removing contaminants before, simultaneously to, or after step a),
   c) drying the comminuted PET material,
   d) melting the comminuted PET material, admixing 0.105 wt % of pyromellitic dianhydride as a chain extender or chain brancher, and extruding reactively the melt of comminuted PET material and chain extender or chain brancher, wherein the admixing of the chain extender or the chain brancher can take place before or during melting, and wherein a temperature during extrusion is selected such that the reactive extrusion increases the intrinsic viscosity by 0.05 to 0.2 dL/g and the extruded material has an intrinsic viscosity between 0.8 and 0.9 dL/g,
   e) producing granules from the extruded PET material, and
   f) increasing an intrinsic viscosity of the granules further by a subsequent heat treatment in solid state polycondensation, wherein the solid state polycondensation is carried out at a temperature of 200° C. increasing the intrinsic viscosity by a further 0.1 to 0.6 dL/g to an intrinsic viscosity above 0.9 dL/g.

* * * * *